United States Patent
Bauer et al.

(10) Patent No.: US 6,898,972 B2
(45) Date of Patent: May 31, 2005

(54) MICROMECHANICAL SPEED SENSOR

(75) Inventors: Karin Bauer, Oberhaching (DE); Tanjo Gleissner, Munich (DE); Konrad Lentner, Mintraching (DE); Stefan Sassen, Munich (DE); Josef Schalk, Altheim (DE); Ralf Voss, West Bloomfield, MI (US)

(73) Assignee: EADS Deutschland GmbH, Munich (DE)

(*) Notice: Subject to any disclaimer, the term of this patent is extended or adjusted under 35 U.S.C. 154(b) by 0 days.

(21) Appl. No.: 10/344,925

(22) PCT Filed: Aug. 6, 2001

(86) PCT No.: PCT/EP01/09066
§ 371 (c)(1),
(2), (4) Date: Jul. 23, 2003

(87) PCT Pub. No.: WO02/14787
PCT Pub. Date: Feb. 21, 2002

(65) Prior Publication Data
US 2004/0011130 A1 Jan. 22, 2004

(30) Foreign Application Priority Data
Aug. 18, 2000 (DE) .......................................... 100 40 537

(51) Int. Cl.⁷ ............................................... G01P 9/04
(52) U.S. Cl. .................................. 73/504.12; 73/504.14
(58) Field of Search .......................... 73/504.12, 504.14

(56) References Cited

U.S. PATENT DOCUMENTS

| | | | |
|---|---|---|---|
| 4,598,585 A | 7/1986 | Boxenhorn | |
| 5,016,072 A | 5/1991 | Greiff | |
| 5,195,371 A | 3/1993 | Greiff | |
| 5,203,208 A | 4/1993 | Bernstein | |
| 5,408,877 A | * 4/1995 | Greiff et al. | ............. 73/504.12 |
| 6,032,531 A | 3/2000 | Roszhart | |

FOREIGN PATENT DOCUMENTS

DE 3509948 7/1986

* cited by examiner

Primary Examiner—John E. Chapman
(74) Attorney, Agent, or Firm—Crowell & Moring LLP

(57) ABSTRACT

A micromechanical rotation speed sensor with a gimbals-mounted structure capable of vibration includes two vibration elements (4, 5) which are swivelled about two axes (A, B) oriented perpendicular toward each other. An excitation unit in the form of an electrode (7) sets the first vibration element (4) into a vibration about the first axis of rotation (A). A read out unit in the form of a read out electrode (8) records a tipping or vibration of the second vibration element (5) about the second axis of rotation (B) as a measure for the rotation speed of the sensor. Additional mass elements (6a, 6b) which are symmetrically aligned are situated on the upper side (2a) and the underside (2b) of the first vibration element (4) which form a rocker. The sensor is manufactured of at least three individually processed wafers which are finally joined together and form a top part (1), a midsection (2) and a bottom part (3).

24 Claims, 3 Drawing Sheets

MICROMECHANICAL SPEED SENSOR

This application claims the priority of International Application No. PCT/EP01/09066, filed Aug. 6, 2001 and German 100 40 537.1, filed Aug. 18, 2000.

The present invention concerns a micromechanical rotation speed sensor as well as a method for manufacturing a micromechanical rotation speed sensor.

BACKGROUND AND SUMMARY OF THE INVENTION

Gimbal-mounted micromechanical rotation speed sensors possess, for example, two frames with an ability to vibrate with a central inertial mass. Through an electrostatic drive the mass is brought into resonant vibrations about an excitation axis. During a rotation of the sensor about an axis of rotation which is oriented vertically in relation to the excitation axis, the Coriolis force acts upon the oscillating inertial mass. In this way, a vibration is periodically excited about a read out axis which is oriented vertically in relation to the excitation axis and toward the axis of rotation. The amplitude of the oscillation so generated is a direct measure for the rates of rotation to be measured. Reading out the amplitude can take place electrostatically, for example.

Micromechanical rotational speed sensors can, for example, be used in automotive engineering, in aerospace engineering as well as in connection with exploration and production methods. For example, the rotation speed sensors can be used for vehicular stabilization, regulating driving dynamics and for navigation systems or even within systems for autonomous driving. Further possible uses include aircraft navigation and stabilization. In the area of space travel, platforms can be stabilized with such sensors and be controlled in their position. Navigation systems, such as GPS/INS, for example, are supplemented by rotation speed sensors of this type, especially in the area of avionics. In the exploration for raw materials, drill heads, for example, can be controlled with rotation speed sensors. Rotation speed sensors are used for controlling robots in modern production technologies.

In U.S. Pat. No. 4,598,585, a rotation speed sensor with a gimbals-mounted structure is described in which a framework with a vibration capacity is mounted about a y axis. An element fastened on the frame capable of vibration about an x axis is situated inside the frame. An inertial mass is arranged on the internal element. Drive elements serve to set the frame into vibration about the y axis. The displacement of the internal element due to the Coriolis force is measured capacitively.

The known micromechanical rotational speed sensors nonetheless have the disadvantage that the measuring accuracy is often insufficient. Also very large cross sensitivities occur as a rule. Above and beyond this, often a great sensitivity toward vibrations can be established. Furthermore, the known rotation speed sensors are usually associated with high manufacturing costs.

The object of the invention is therefore to create a micromechanical rotation sensor which has a greater sensor sensitivity and a low cross sensitivity and to disclose a method for its' manufacture. Above and beyond this, the rotation speed sensor should be robust, have low sensitivity towards mechanical vibrations, and be economically manufacturability.

This object is accomplished through the micromechanical rotation sensor in and the method for manufacturing a micromechanical rotation speed sensor of the present invention.

The micromechanical rotation speed sensor of the invention includes a first vibration element which is pivoted about a first axis, a second vibration element which is pivoted about a second axis which is oriented vertically in relation to the second axis, an excitation unit in order to set the vibration element into vibrations about the first axis and a read out unit to record vibrations of the second vibration element about the second axis, whereby at least two additional mass elements are fastened on the first vibration element which are aligned symmetrically to a plane which is defined by the first and second axis.

A significantly higher sensor resolution and sensitivity results from the symmetrically aligned additional mass element. Moreover, the added masses or additional mass elements can be extremely large. In this way, there arises a broad transfer of mass centers symmetrically to the axis of rotation, which brings about an extreme heightening of sensor sensitivity. The symmetrical construction reduces cross sensitivity toward rotation speeds outside the axis of sensitivity of the sensor and reduces the sensitivity towards an acceleration acting upon the sensor. The sensor can be manufactured economically and can be designed extremely robustly.

Advantageously, the common center of gravity of the two mass elements lies at the point of intersection of the first and second axis. In this way, a maximal symmetry results.

Preferably, the additional mass elements are manufactured separately from the first and/or second vibration elements, whereby in particular the shape, size or even material of the mass elements are selectively chosen in order to establish the parameters of the sensor. Through the free choice of shape, size and material of the additional masses, the mass distribution, overall mass and the distribution of factors of inertia of the sensor can be selectively chosen. In this way, additional configuration possibilities arise for optimizing the sensor with respect to resolution, cross sensitivity, sensitivity to shock, and reduced influence of manufacturing tolerances or also reduced sensitivity toward vibrations.

In particular, added masses with special physical properties can be formed by freely selecting materials for the additional mass elements which are especially suitable according to the standards of the rotation speed sensor. Furthermore, the sensor element can be trimmed by the special selection of added masses without changes or interferences having to be undertaken on the remaining structures or on the etched out gimbals-mounted structure.

The added masses can be manufactured economically with high precision. Spheres are especially preferably used as mass elements, which can be economically manufactured with a very low geometric tolerance of, for example, 0.1%. In this way, a very high reproducibility of the mass distribution of the rotation speed sensor results through the use of spheres. But rectangular prisms, cones, pyramids or truncated pyramids and cylinders can be used as mass elements which can likewise be manufactured very economically and with low geometrical tolerance. It is especially beneficial to arrange the cones or pyramids with their tips oriented toward one another. In this way, the centers of gravity of the individual mass elements are transferred as far as possible or removed as far as possible from one another.

The additional mass elements in particular have, for example, magnetic properties. This brings about a mutual attraction of the additional mass elements so that they orient themselves completely symmetrically. Further advantages are the adhesion to the substrate resulting from this, the possibility of self-calibration, as well as the possibility of a magnetic or electromagnetic excitation to vibrations.

Preferably the additional mass elements are made of a material which has a higher density than the material of the first and/or the second vibration element. This leads to a beneficial distribution of mass inertia factors. Moreover, metals, for example, especially steel, can be used as material for the additional mass elements, whereas, in contrast silicon, for example, is used for the remaining sensor structure or for the first and second vibration element. There is thus a free choice of material for the added masses, since the material of the added masses need not be compatible with the processing steps, for example, for a silicon wafer, from which the vibration elements, the structure capable of vibration, are advantageously manufactured. In this way, an extreme increase in sensor sensitivity can take place economically.

For example, the first vibration element is a rocker and the second vibration element is a frame, whereby the rocker and the frame form a gimbals-mounted structure capable of vibration which is fastened into a retaining structure.

Advantageously, the rotation speed sensor is manufactured from at least three wafers joined together which are preferably individually processed. Moreover the rotation speed sensor has a bottom wafer, a midsection wafer and a top wafer. In this way, there results a reduced complexity during the manufacturing process as well as the possibility of testing the individual components. Furthermore, the yield is increased owing to which reduced costs arise for the sensors. Moreover, cavity and electrode structures which are situated in the interior of the sensor after assembly can be freely configured. In addition, a greater possibility for selecting electrode material and the material for the added masses exists since the material must be compatible with fewer manufacturing steps. The use of top and bottom wafers of identical construction is possible. This makes possible a completely symmetrical construction in relation to the central plane.

Preferably the first and second vibration element is constructed in the midsection wafer. The midsection wafer can in particular be processed on the upper and underside. In this way, the symmetry of the central plane is guaranteed since the masses or additional mass elements can be applied symmetrically. The temperature drift of the sensor properties can be reduced by the symmetry.

Advantageously, the bottom and/or top wafer are made of alkali-containing glass wafers, such as, for example, Borofloat or Pyrex glass, of which, for example, at least one wafer is provided with an electrode structure. In this way, scattering and cross talk properties are reduced since the electrode structure is situated on insulated material. In particular, for example, the thermal coefficient of expansion is adapted to the silicon of the midsection wafer owing to which thermal distortions can be kept low during manufacture, and from which a reduced temperature sensitivity of the sensor arises during operation. The use of alkali-containing glass wafers in addition makes possible a reliable joining with the midsection wafer using an anodic bonding method.

Owing to the fact that the wafers or the midsection wafer are joined with the bottom and the top wafer, for example, by anodic bonding, there results a reliable connection which requires a temperature of at most 450E C for manufacture. The maximum temperature is low enough so that suitably selected metallic coatings are not altered. That is, no oxidation occurs and no formation of alloys either. The anodic bonding allows a good adjustment of the wafers in relation to one another since no liquid phase arises during the bonding process. The adjustment tolerance of the rotation speed sensor is for this reason mostly less than a few μm.

Advantageously a gap separation is located between the midsection wafer and the bottom wafer or between the midsection wafer and the top wafer which is small in relation to the lateral electrode extension which serves for electrostatic excitation and/or capacitive reading out of the actuator unit and/or sensor unit vibration of the vibration element. The ratio between the gap separation and the lateral electrode extension is, for example, smaller than 1:20, preferably smaller than 1:50, and especially smaller than 1:100 or even 1:1000. In this way, there result very large capacity values which once again make possible high electric signals for the sensor unit or large electrostatic forces for the actuator unit.

Preferably the gap separation for the actuator unit structure, which makes possible the excitation vibration of the first vibration element, is greater than the gap separation for the sensor unit structure which makes possible the read out vibration of the second vibration element. In this way, the actuator unit vibration can take place with a very high mechanical amplitude. In addition, damping the vibration of the vibration with a larger gap separation is less (squeezed film damping), which leads to a higher mechanical amplitude with resonant excitation. On the other hand, a large capacity and therewith a high electrical output signal results through the small slot distance with the sensor element structure.

Advantageously, the wafer on the basis of which the mechanical structure or the first and second vibration element is etched is made of single crystal silicon. Moreover, the structure or gimbal structure of the sensor capable of vibration is etched from a full wafer, that is, manufactured in bulk technology. The structure capable of vibration includes, for example, the first and second vibration element and is preferably constructed on the basis of the midsection wafer. Through the use of single crystal silicon, very slight material damping and furthermore, negligible, slight fatigue and aging phenomena are obtained. Manufacture in silicon technology leads to low manufacturing tolerances with simultaneous low costs. In addition, silicon possesses a high mechanical load-bearing capacity with low density at the same time, from which a robust structure able to bear loads results.

Advantageously, the first and/or second vibration angle is constructed non-rectangularly. That is, the structure capable of vibration has a non-rectangular shape or a symmetrical convex free form. The vibration elements can, for example, be configured round or even have edges, which border on each other at an angle of more than 90E. For example, the vibration elements can be octangular.

In particular, taking into consideration large additional inertial masses, which cause the increase in sensitivity, an enlargement of the capacity surfaces results with higher bending strengths and therewith higher inherent frequencies of the frame or outer structure capable of vibration.

In this way, a high rigidity for setting the rotary band of the frame or the torsion suspension is attained which cannot be attained with a rectangular structure. The torsion frequency is basically determined by the torsion or rotary band as suspension itself. One can consequently greatly shorten the rotary band and attain a Z mode of the sensor adjustable almost independently of the torsion frequency, the sensor being oriented perpendicular to the wafer plane.

Through the shape described above, and through the particular arrangement of the added masses, an especially high sensitivity can be attained with a small construction in connection with a specified surface of the structure capable of vibration.

Furthermore, the inherent frequency spectrum of the mechanical structure is more favorably configured through the non-rectangular shape. Nonrectangular shapes can be found in which the inherent torsion frequencies of the rocker or the structure capable of vibration are the lowest eigenmodes of the structures and all other modes come to lie at significantly higher frequencies. In this way, one can guarantee the required frequency distance between the mechanical noise spectrum, for example in a rough environment, and the operating modes and eigenmodes of the sensor.

Advantageously, the frequency of the actuating unit vibration which is caused by the excitation unit, and/or the frequency of the sensor unit vibration which is generated by the Coriolis force, is the lowest eigenmodes of the structure capable of vibration which is formed by the first and second vibration element. In this way, there especially results a high robustness of the mechanical structure toward shock stresses and mechanical vibrations.

By the use of mechanical damping elements, for example mechanical low pass filters, in constructing the sensor element, it is possible to separate the rotation speed signal from higher frequency noise signals. Moreover the rotation speed signal has a band width from 0 to 100 Hz, for example. Low frequency noise signals, the band width of which is comparable with the band with of the rotation speed, cannot influence sensor behavior, or can only do so with strong suppression, on account of the position of the inherent frequencies of the sensor structure. Moreover, the inherent frequencies of the sensor structure, that is, the actuator unit and the sensor unit vibration, lie at ca. 10 kHz, while all other eigenmodes lie above it.

In particular the surface ratio between the second vibration element and the first vibration element is greater than 5:1, preferably greater than 10:1. Due to this surface ratio between the frame which forms the outer sensor unit structure or the second vibration element, and the rocker which forms the internal actuating unit structure or the first vibration element, there results a further enlargement of the electrical sensor signal with simultaneous optimal mechanical design of the sensor structure or the position of the eigenmodes. Furthermore, a far-reaching decoupling of the inherent frequencies of rocker and frame takes place. Owing to this surface ratio and the ratio of the mass inertia factors going along with it, it is possible to determine the inherent frequency of the rocker basically as a function of the inertial mass or of the mass elements, and the inherent frequencies of the frame basically as a function of the frame geometry. In this way, an almost independent frequency compensation can be attained. That is, the sensor can be determined in a simple manner and with great exactitude.

Preferably the micromechanical rotation speed sensor has a metallic coating for formation of an electrode or electrode structure which is covered with a dielectric layer. In this way, a passivation takes place so that the metallic coating is protected from corrosion. Leakage currents between the insulated electrodes are considerably reduced. Since the metallic coating in particular sits on fixed, unmoved parts of the sensor, there are hardly any restrictions with regard to the type and method of passivation.

Advantageously, the micromechanical rotation speed sensor includes one or more electrodes which are enclosed by a closed printed conductor. Moreover, the printed conductor can, for example, be inherently contacted. Even the corresponding leads can be surrounded by the closed printed conductor. Through this measure, the electric cross talk between the electrodes for the sensor unit and/or for the actuating unit are reduced. Since the metal-coated electrodes sit, for example, only in the top and/or bottom wafer, and in this case not in the structured midsection, the guard electrodes are easy to contact and are subject to fewer frame conditions in their shape and condition than if they had to be installed in the midsection.

Preferably the micromechanical rotation speed sensor has an ohmic pressure contact for connection of the midsection wafer to the bottom wafer or to a bonding pad of the bottom wafer. Even the top wafer can be contacted in this manner. Preferably there is no metallic coating on the midsection wafer. In particular, the entire structure of the midsection wafer possesses an electric potential.

In this way, it is possible for the electrical connection of the midsection wafer to take place through standardized wire bonding pads which have, for example, a size of 100 $\mu$m×100 $\mu$m. In this way, the entire connection pads can be located on one plane and be arranged lying beside one another. This considerably reduces the expense in electrical contacting of the sensor element with the associated electronics for actuating unit and sensor unit.

Due to the lack of a metallic coating on the midsection wafer, the manufacturing cost of the midsection wafer is considerably reduced. Furthermore, the structure capable of vibration manifests but a very small material damping and has no mechanical distortions. This additionally contributes to a reduced temperature dependency of sensor properties.

The sensor interior can be hermetically sealed, whereby, for example, buried printed conductors serve to contact the electrodes in the sensor interior. Due to the connection between the bonding pads and the electrode surfaces by means of buried printed conductors, the sensor interior can be hermetically sealed and consequently can neither become dirty, nor corrode, nor be changed by moisture or other environmental influences.

The method of the invention for manufacturing a micromechanical rotation speed sensor includes the following steps: Readying at least three wafers; structuring the individual wafers, wherein in one of the wafers a gimbals-mounted structure capable of vibration is mounted; constructing an excitation unit to excite a first vibration of the structure; constructing a read out unit to record a second vibration of the structure, whereby the wafer is connected with the vibration-enabled structure on both sides with a further wafer. Through this method, it is possible to arrange extremely large added masses on the midsection capable of vibration, and in this way to attain a significantly higher sensor resolution.

The further advantages which arise form the manufacture of the rotation speed sensor from at least three individually processed wafers which are subsequently combined were already described in connection with the rotation speed sensor of the invention.

In particular, additional mass elements can be fastened to the axis of the first and/or the second vibration on the structure capable of vibration. Furthermore, the wafer with the structure capable of vibration on its upper and underside can be processed.

Advantageously, the structure capable of vibration or gimbal structure of the sensor can be etched from a single, complete wafer and the suspension of the mechanical or vibration-enabled structure which forms the midsection of the sensor is manufactured in a single etching step. In this way, a high manufacturing exactitude of the geometrical structure or the vibration-enabled structure is obtained, since, for example, several masks need not be adjusted in relation to one another. It is also possible to conduct the structuring of the silicon with flanks perpendicular to the wafer plane. The midsection itself is therefore up-down symmetrical with high exactitude. In this way, a basic source for the "quadrature error" is ruled out. There furthermore results a free ability to configure the lateral shape, especially when using the anisotropic plasma etching technique.

Advantageously a metallic coating structure is applied to the bottom wafer of the three wafers using thin layer technology which, for example, forms condenser surfaces, leads and connection pads. In this way, manufacturing costs are reduced as the complete metallic coating is located on only one wafer. The thin layer technology makes manufacture of small structures with reproducible thicknesses possible which are necessary for a reproducible gap separation. For example, the printed conductor path comes to 10 $\mu$m, the conductor path and electrode thickness to 140 nm and the gap separation, for example, to 1.5 $\mu$m. The electrical connection of the sensor element to the actuating unit and sensor unit electronics takes place, for example, over standardized wire bonding pads. Their size is, for example, 100 $\mu$m×100 $\mu$m.

The excitation of the rotation speed sensor or the first vibration element can take place in a great many ways, for example, electrostatically, piezoelectrically, magnetostrictively or even magnetically or using magnetic added masses. In this case, the rotation speed sensor is provided with electrostatic, piezoelectric, magnetostrictive or even magnetic elements or magnetic added masses.

In addition, a control apparatus can be provided which has an electronic unit for regulating and/or forcing the excitation vibration. The electronic unit can be designed such that the first vibration element vibrates in its inherent frequency. It can also be designed such that the vibration of the first vibration element is forced with a certain frequency which need not be the inherent frequency. This has the particular advantage that the read out electrodes for measuring the vibration of the second vibration element do not impair the function of the sensor or falsify the measuring results, even when they are arranged very near to the electrodes for excitation of the first vibration element and/or would influence a free vibration of the first vibration element.

Through the choice of a suitable electrode shape of the excitation electrodes, the influence of the read out electrodes for measuring the vibration of the second vibration element is further minimized. For example, the individual electrodes of a pair of excitation electrodes can be divided and controlled separately by the electronics unit in order to shut off the aforementioned influence or compensate for it.

The reading out process can likewise take place in several known manners and in particular, for example, takes place capacitively or optically. In this case, the rotation speed sensor is provided with capacitive or optical elements for reading out the vibration of the second vibration element generated by the Coriolis force. Continuous automatic testing and automatic calibration functions in operation are possible.

BRIEF DESCRIPTION OF THE DRAWINGS

The rotation speed sensor of the invention is described below by way of example in accordance with a preferred embodiment, wherein.

DETAILED DESCRIPTION OF THE PREFERRED EMBODIMENT

Figure 1:
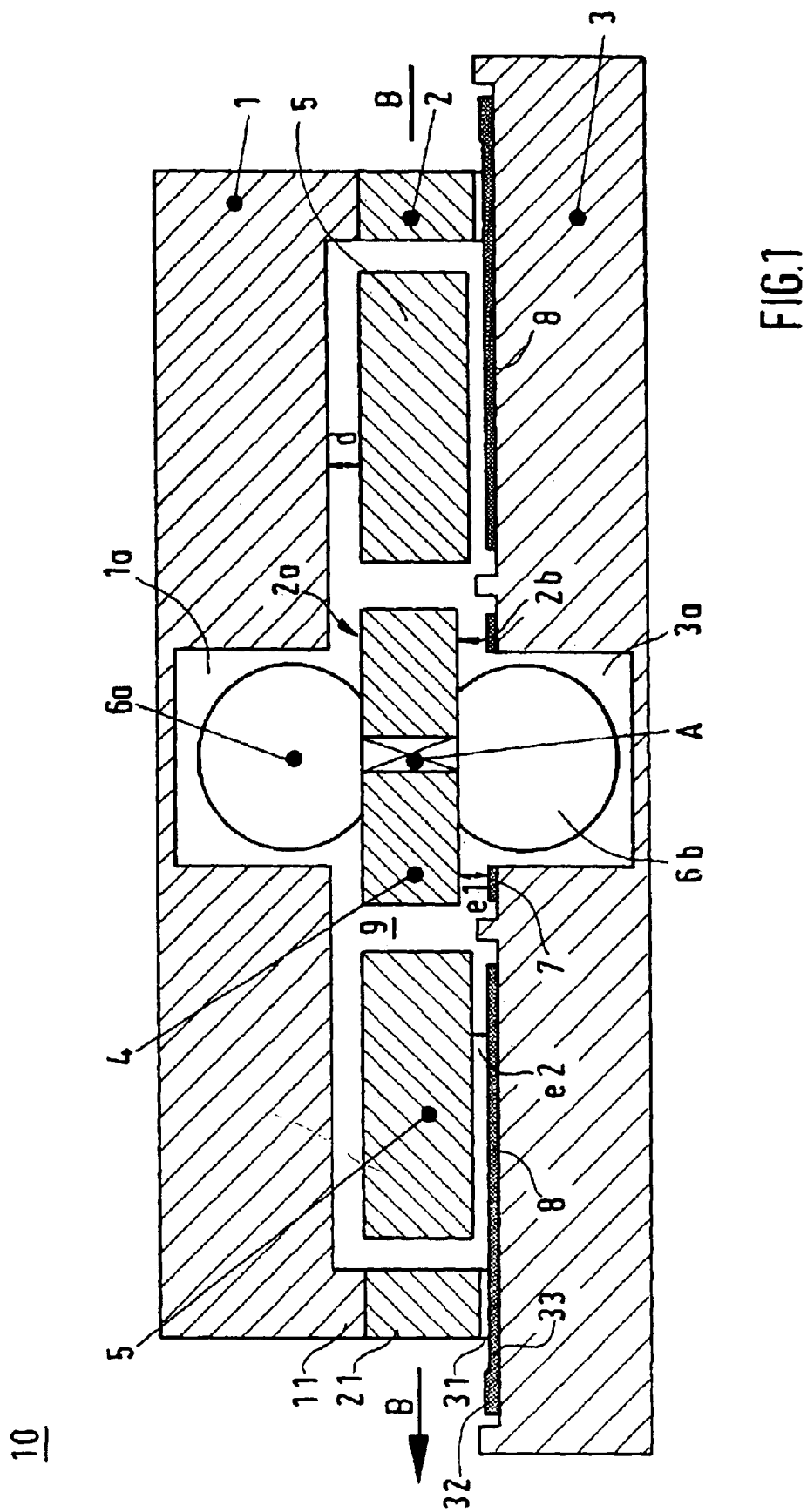
FIG. 1 Depicts a section through a micromechanical rotation speed sensor in accordance with a preferred embodiment of the invention.

FIG. 1 shows a micromechanical rotation speed sensor 10 which is made from a top part 1, a midsection 2 and a bottom part 3. These parts are individually processed wafers which are finally combined. The midsection 2 forms a vibration-enabled structure with a first vibration element 4 and a second vibration element 5. The first vibration element 4 forms a rocker and the second vibration element 5 forms a frame in which the rocker is pivoted about a first axis of rotation A. The frame or the second vibration element 5 is pivoted within the sensor about a second axis of rotation B which runs in the wafer place perpendicular to the first axis of rotation A. An in any given case additional mass element 6a, 6b is located on the upper side 2a and on the underside 2b of the midsection 2 or of the first vibration element. The additional mass elements 6a, 6b are arranged symmetrically toward the midsection 2 or toward the midsection plane which is formed by the axes of rotation A and B. In the represented, preferred embodiment, the additional mass elements 6a and 6b are arranged symmetrically toward axis of rotation A and symmetrically toward axis of rotation B. That is, there is symmetry to the two axes of rotation A and B and toward the point of intersection of the two axes of rotation A and B.

Electrodes 7 form together with a not represented control unit an excitation unit in order to bring the first vibration element 4 or the rocker into vibrations about axis of rotation A. Further electrodes 8 form together with an electronic unit not depicted in greater detail a read out unit in order to record the vibrations of the second vibration element 5 or the frame about axis of rotation B. The excitation and the reading out of the vibrations take place electrostatically or capacitively. For this the midsection 2 has an electric potential.

Recesses 1a or 3a are provided in the top part 1 and the bottom part 3 into which in any given case a mass element 6a or 6b projects. Moreover a room for play or distance exists between mass elements 6a, 6b and the in any given case bordering structure of the top part 1 or bottom part 3 which enables the vibration back and forth of the mass element 6a, 6b connected with the rocker within recess 1a or 3a.

There is a gap separation d between top part 1 and midsection 2 and likewise a gap separation e1, e2 exists between midsection 2 and bottom part 3. Gap separations d, e1, e2 serve for electrostatic excitation or capacitive reading out of the actuating unit and sensor unit vibration of the vibration-enabled structure of the midsection 2. The gap separations d, e1, e2 are very small in relation to the lateral extension of the electrode structure or to the lateral extension of electrodes 8 which serve for reading out the vibration of the frame or second vibration element. The ratio of the gap separation d and of gap separation e2 to the lateral extension of electrodes 8 is 1:00 or smaller. In this way, very high capacity values result for the sensor unit or large electrostatic forces for the actuating unit.

The gap separation e1 between the bottom part 3 and the first vibration element 4 which makes possible the tipping or vibrating of the first vibration element 4 about axis of rotation A, is greater than the gap separation e2 between bottom part 3 and the second vibration element or frame 5 which makes tipping about axis of rotation B possible. In this way, a large mechanical amplitude with resonant excitation is possible, while on the other hand, owing to the small gap separation with the read out and the large capacity associated therewith, a high electrical output signal is attained.

The top part 1 has a projection 11 on its edge through which it is connected fast with the edge 21 of the midsection. Through the projection 11 or through the edge raised in relation to the central region of the top part, an interior 9 is formed inside the sensor 10, which offers the two vibration elements 4, 5 or the vibration-enabled structure sufficient space for conducting the excitation or read out vibration. Bottom part 3 also has a projection connection region or region 31 on its surface which serves for connecting the bottom part to the middle part 2 and in this way offers space for the vibrations.

The bottom part 3 which can be a bottom wafer or a part of a bottom wafer, has a larger lateral extension than the remaining wafer parts or wafers which form the top part 1 and the midsection 2. That is, the bottom part 3 has an edge region which extends over the edge of the midsection 2 of the top part 1. Contact areas 32 are provided on the surface of the bottom part 3 or of the wafer in the edge area in the form of connection pads which serve to contact the metal coatings or electrodes 7, 8 in the interior 9 of the sensor. The contact surfaces 32 are connected with electrodes 7, 8 through printed conductors 33, whereby the contact surfaces 32, the printed conductors 33 and the electrodes 7, 8 are constructed on a plane on the surface of the bottom part 3 or the lower wafer. The conductor paths 33 are buried conductor paths, that is, they are incorporated into the wafer or worked into it. In this way, a hermetic or vacuum-tight seal of the interior 9 takes place.

Figure 2:
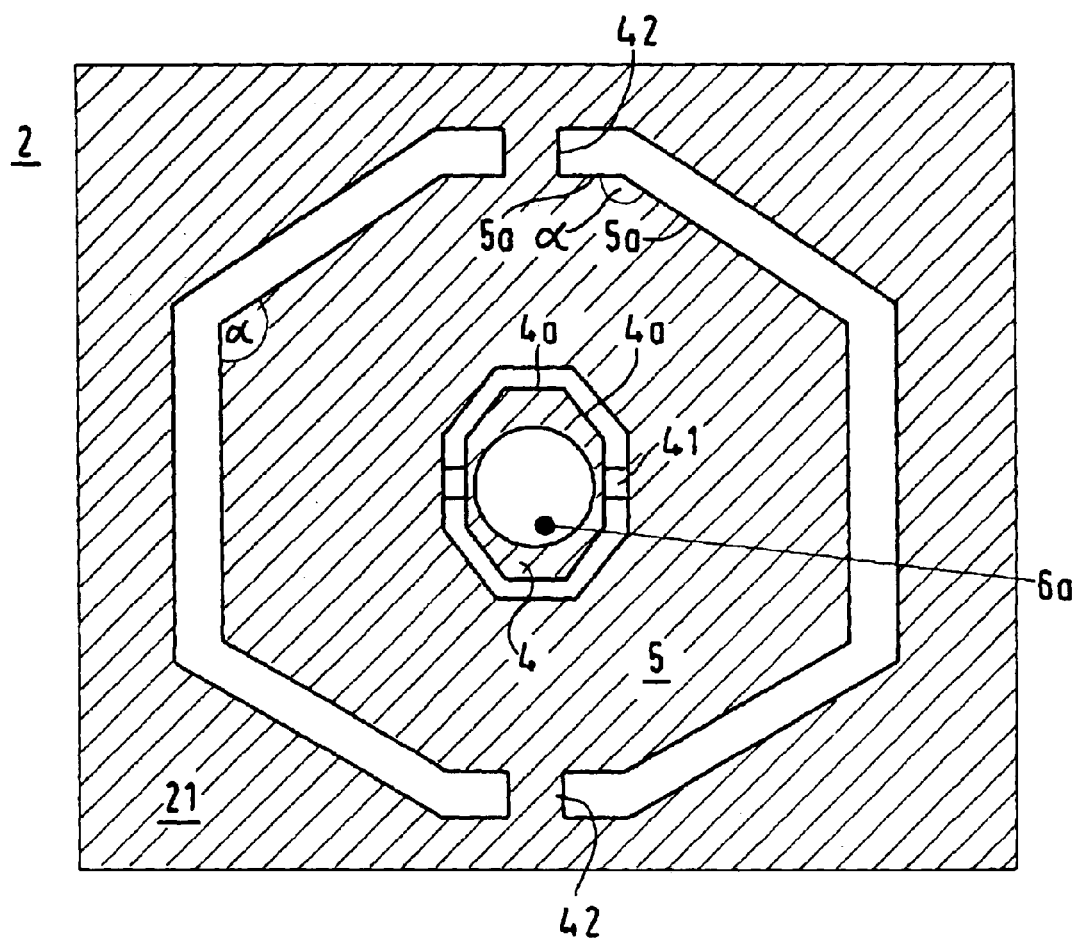
FIG. 2 Shows a plan view of the midsection of the rotation speed sensor of the preferred embodiment.

FIG. 2 illustrates a top view on the midsection 2, which can be part of a wafer or also a whole wafer of the rotation speed sensor in accordance with the preferred embodiment. The internal vibration element 4 or the rocker is connected with the outer vibration element 5 or frame through two opposite-lying suspensions 41 capable of vibration or torsion. The vibration-enabled suspension 41 permits a tipping or vibration of the rocker about axis A which extends through the two suspensions 41. The frame or the outer vibration element 5 is connected by vibration-enabled suspensions 42 capable of torsion with the remaining part of the wafer or midsection 2 which forms a retaining structure 21 which is fixed between the top part 1 and the bottom part 3 of the wafer. The vibration-enabled suspension 42 of the frame or second vibration element 5 on the retaining structure 21 allows a tipping or vibrating of the frame on the retaining structure 21 about axis B which extends through the two suspensions 42 and is oriented perpendicular to axis of rotation A of the first vibration element 4.

The upper additional mass element 6a is symmetrically fastened in the center of the vibration-enabled structure formed from rocker and frame and moreover at the same time arranged in the center of the rocker or the first vibration element 4. The second additional, identically constructed mass element 6b is arranged directly beneath (see FIG. 1).

Vibration elements 4, 5 have edges 4a, 5a which are oriented non-rectangularly toward each other, but rather form an angle ∀ which is greater than 90°. That is, the vibration-enabled structure which consists of the two vibration elements 4 and 5 has a non-rectangular geometry through which an enlargement of the capacity surfaces with simultaneously higher bending strength, and therewith higher inherent frequencies of the frame, can be attained. The suspension 42 or the rotary band of the frame can also be strongly shortened. Overall, the inherent frequency spectrum of the mechanical structure can be more beneficially configured through the non-rectangular geometry. Further advantages of the non-right angle shape were described already above.

Figure 3:
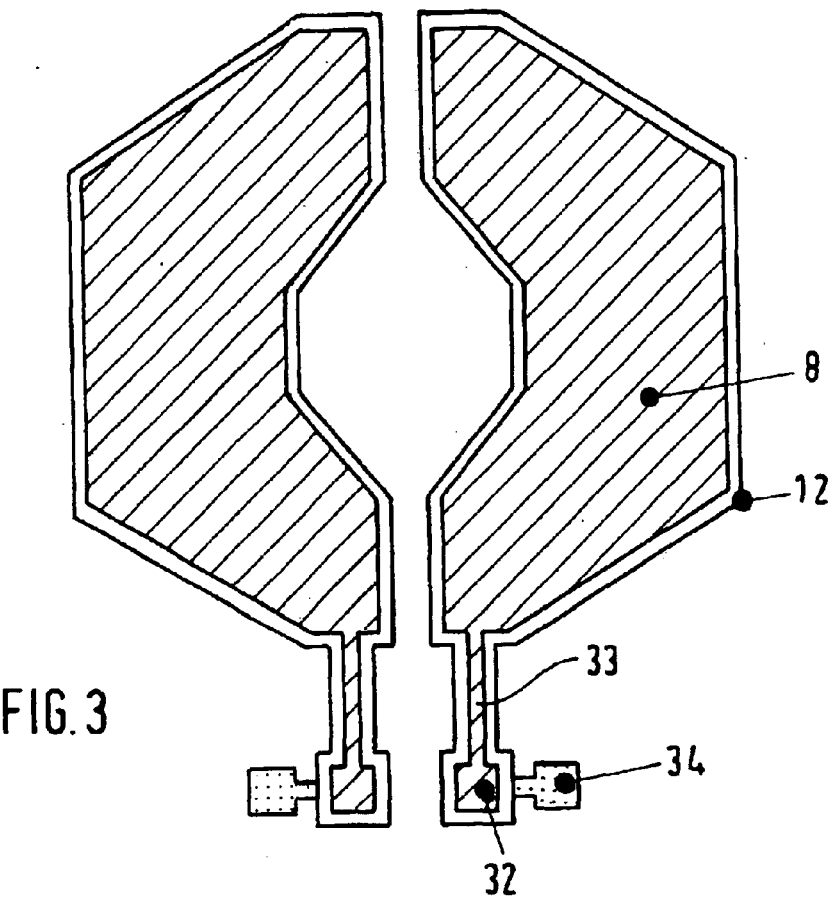
FIG. 3 Provides a plan view of an electrode structure of the rotation speed sensor.

FIG. 3 shows a top view of a metallic coating formed on the bottom part 3. The metallic coating forms the two laminarly constructed electrodes 8, which serve for capacitive reading out of the vibration of the frame or the second vibration element 5 which is generated on the basis of the Coriolis force with a rotation of the sensor about sensitive axis directed vertically in relation to the axes of rotation of the vibration elements 4 and 5. The electrodes 7 are not represented here, but are similarly constructed.

The overall structure of the midsection wafer or the midsection 2 possesses an electric potential opposite to the metallic coating or electrodes 7, 8 on the bottom part 2. In this way, it is not necessary to install metallic coatings likewise on the vibration-enabled structure which are opposite to electrodes 7, 8 for excitation and for reading out (see FIG. 1).

Each electrode 7, 8 is completely surrounded by an annular electrode 12 which surrounds electrodes 7, 8 as well as the outward leading printed conductor 33 and the external contact surfaces 32. The annular electrode 12 is moreover separately contactable through its own contact surface 34 positioned outside the sensor interior. The annular electrode 12, which forms a printed conductor, reduces the electric cross talk between electrodes 7, 8 for sensor unit and actuating unit.

Figure 4:
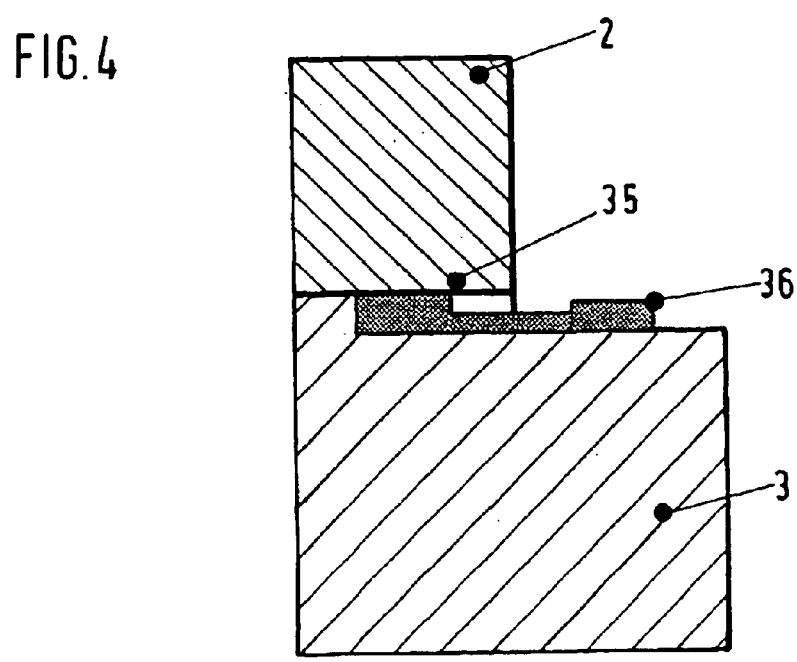
FIG. 4 Illustrates a section which represents the edge area of the sensor with the connection between midsection and bottom part.

FIG. 4 shows the connection between midsection 2 and bottom part 3 in the margin area of the sensor 10 in enlarged representation. Moreover the midsection wafer or the midsection 2 is connected through an ohmic pressure contact 35 to a bonding or connection pad of the bottom wafer 3 which is constructed in the form of a contact surface 36 on the bottom part 3. The overall connection pads are situated on a plane and are arranged side by side. In this way, electrodes 7, 8 as well as midsection wafer 2 can be electrically contacted in a simple manner and with a clearly reduced expenditure.

The midsection wafer 2 consists in the preferred embodiment of a single crystal silicon while the bottom part 3 and the top part 2, for example, is made of alkali-containing glass wafers such as, for example, Borofloat or Pyrex glass. At least one of the wafers is provided with an electrode structure. Obviously other materials are possible for the sensor, whereby the choice of materials is directed according to the respective demands.

Mass elements 6a, 6b are steel spheres in the present case which at all times are mounted in a bulge of the upper side and the underside of the rocker or the first vibration element 4. Moreover the steel spheres lie exactly opposite so that a high geometry is guaranteed. In a particular embodiment, magnetic steel spheres are used which orient themselves mutually. Besides steel spheres, obviously other forms and materials are possible for configuring the mass elements 6a, 6b, whereby the sensor parameters can be adjusted by suitable selection.

In addition to an electrostatic excitation unit, the most varied excitation methods are possible, such as, for example, piezoelectric, magnetostrictive or even magnetic excitation processes. The reading out process can also take place in other known ways, whereby besides capacitive reading out, optical reading out methods are also possible.

An example for the manufacture of sensor 10 is described below.

Three wafers are individually processed for manufacturing the sensor, which form the top part 1, the midsection 2 and the bottom part 3. The wafers for the top part 1 and for the bottom part 3 are structured such that recesses for the mass elements 6a, 6b are present in their center, whereby sufficient room for play is offered for conducting the vibrations. A central region of the respective wafer surface is lowered in relation to the margin area so that in this region of the top and bottom part a gap separation results in any given case in relation to the midsection 2 which makes possible vibrating the vibration-enabled structure of the midsection.

The midsection wafer is processed on the upper side and underside so that the symmetry toward the middle plane is guaranteed. Moreover the vibration-enabled structure of the sensor, consisting of frame and rocker, is etched out of a complete wafer, whereby the suspensions 41, 42 (see FIG. 2) are manufactured in one etching step.

Now the mass elements 6a, 6b are fastened on the upper side and the underside of the wafer which is provided as midsection 2, for example by gluing or magnetically.

On the wafer which is provided for the bottom part 3, a metallic coating structure is applied using thin layer technology which forms the electrodes or condenser surfaces as well as the leads and connection pads. Moreover, the metallic coating is covered with a dielectric layer for passivation.

Following separate prefabrication of the three wafers or sensor elements, these are assembled and joined fast with one another. Moreover, suitable measures are taken so that there is a vacuum in the interior 9 of the sensor.

Through the symmetrical sensor, sources of error, such as in particular a temperature drift, are avoided, and improve measuring results. The symmetrical added masses on the midsection 2 yield a significantly higher sensor resolution. The highly symmetrical mechanical construction of the sensor leads to a high long term stability or small offset drift. That means the sensor operates stably over the long term and delivers more exact measurement results. It can be subjected to mechanical stress without the measuring results being falsified by loads of this type.

What is claimed is:

1. A micromechanical rotation speed sensor comprising:
    a first vibration element which is swivelled about a first axis,
    a second vibration element which is swivelled about a second axis, said second axis oriented perpendicular toward the first axis;
    an excitation unit for placing the first vibration element in vibration about the first axis;
    a read out unit for recording vibrations of the second vibration element about the second axis; and
    at least two additional mass elements fastened on the first vibration element which are oriented symmetrically in relation to a plane defined by the first and second axis, and a gap separation between said first vibration element and a fixed member for an excitation vibration of the first vibration element is greater than a gap separation between said second vibration member and said fixed member for a read out vibration of the second vibration element; and
    a top portion hermetically sealed with said fixed member wherein each of said top portion and fixed member contain a recess for a respective one of said two additional mass elements.

2. The micromechanical rotation speed sensor according to claim 1, wherein the additional mass elements are manufactured separate from the first and second vibration element whereby form, size and/or material of the additional mass elements are selected in order to at least one of determine and influence sensor parameters.

3. The micromechanical rotation speed sensor according to claim 1, wherein the mass elements are axially symmetrical elements which are fastened on upper side and an underside of the first vibration element, whereby the mass elements are shaped as one of spheres, rectangular prisms, cylinders, cones, pyramids and prisms.

4. The micromechanical rotation speed sensor according to claim 1, wherein the first vibration element is a rocker and the second vibration element is a frame, whereby the rocker and the frame form a gimbals-mounted structure capable of vibration which is fastened in a retaining structure.

5. The micromechanical rotation speed sensor according to claim 1, wherein the additional mass elements are magnetic.

6. The micromechanical rotation speed sensor according to claim 1, wherein he additional mass elements are made of a material which has a higher density than the material of the first and second vibration element.

7. The micromechanical rotation speed sensor according to claim 1, wherein said sensor includes at least three combined wafers which form a bottom part, a midsection and a top part.

8. The micromechanical rotation speed sensor according to claim 7, wherein at least one of the bottom part and/or the top part is manufactured of alkali-containing glass wafers, whereby at least one of the wafers is provided with an electrode structure.

9. The micromechanical rotation speed sensor according to claim 7, wherein the first and second vibration element are constructed in the midsection whose upper side and underside are processed.

10. The micromechanical rotation speed sensor according to claim 1, wherein a gap separation between adjacent wafer parts or wafers, which makes possible a deflection of the first and/or second vibration element, is small in relation to the lateral extension of excitation and/or read out electrodes, whereby the ratio between gap separation and lateral electrode extension is smaller than 1:10.

11. The micromechanical rotation speed sensor according to claim 10, wherein the ratio between gap separation is smaller than 1:50.

12. The micromechanical rotation speed sensor according to claim 10, wherein the ratio between gap separation is smaller than 1:100.

13. The micromechanical rotation speed sensor according to claim 1 characterized in that the additional mass elements are made of metal.

14. The micromechanical rotation sensor according to claim 1, wherein said sensor is a single crystal silicon, whereby the first and second vibration element are made of a single wafer.

15. The micromechanical rotation speed sensor according to claim 1, wherein at least one of the first and second vibration element is constructed in a non-rectangular manner.

16. The micromechanical rotation speed sensor according to claim 1, wherein the first and/or second vibration element has edges, which border on one another at an angle of more than 90 degrees.

17. The rotation speed sensor according to claim 1, wherein a frequency of operation of the actuating unit vibration and a frequency of operation of the sensor unit vibration are the lowest eigenmodes of the first and/or second vibration elements.

18. The micromechanical rotation speed sensor according to claim 1, wherein a surface ratio between the second vibration element and the first vibration element is greater than 5:1.

19. The micromechanical rotation speed sensor according to claim 18, wherein the surface ratio is greater than 10:1.

20. The micromechanical rotation speed sensor according to claim 1, further including a metallic coating for forming an electrode which is covered with a dielectric layer.

21. The micromechanical rotation speed sensor according to claim 1, which includes one or more electrodes surrounded by a closed printed conductor.

22. The micromechanical rotation speed sensor according to claim 1, further including an ohmic pressure contact for connection of a wafer which forms a midsection to a further wafer which forms one of a bottom and top part.

23. The micromechanical rotation speed sensor according to claim 1, further including a sensor interior which is hermetically sealed whereby buried printed conductors are provided for contacting electrodes in the sensor interior.

24. The micromechanical rotation speed sensor according to claim 1, wherein a common center of gravity of the additional mass elements lies in a point of intersection of the first axis and the second axis.

* * * * *